US012525394B2

(12) United States Patent
Chen et al.

(10) Patent No.: US 12,525,394 B2
(45) Date of Patent: Jan. 13, 2026

(54) EMBEDDED INDUCTANCE STRUCTURE AND MANUFACTURING METHOD THEREOF

(71) Applicant: Zhuhai YUEXIN Semiconductor Limited Liability Company, Guangdong (CN)

(72) Inventors: Xianming Chen, Guangdong (CN); Xiaowei Xu, Guangdong (CN); Gao Huang, Guangdong (CN); Benxia Huang, Guangdong (CN); Jindong Feng, Guangdong (CN)

(73) Assignee: Zhuhai YUEXIN Semiconductor Limited Liability Company, Guangdong (CN)

( * ) Notice: Subject to any disclaimer, the term of this patent is extended or adjusted under 35 U.S.C. 154(b) by 703 days.

(21) Appl. No.: 17/956,098

(22) Filed: Sep. 29, 2022

(65) Prior Publication Data

US 2023/0178298 A1 Jun. 8, 2023

(30) Foreign Application Priority Data

Dec. 8, 2021 (CN) ........................ 202111530043.7

(51) Int. Cl.
*H01F 41/12* (2006.01)
*H01F 27/28* (2006.01)
(Continued)

(52) U.S. Cl.
CPC ....... *H01F 41/122* (2013.01); *H01F 27/2895* (2013.01); *H01F 27/323* (2013.01); *H01F 41/08* (2013.01)

(58) Field of Classification Search
CPC .. H01F 41/122; H01F 27/2895; H01F 27/323; H01F 41/08; H01F 17/0033;
(Continued)

(56) References Cited

U.S. PATENT DOCUMENTS 5,126,707 A * 6/1992 Ikeda .................... H01L 21/702 336/200
5,302,932 A * 4/1994 Person ................ H01F 17/0013 336/200
(Continued)

FOREIGN PATENT DOCUMENTS

CN 113053849 A 6/2021

*Primary Examiner* — Sunil K Singh
*Assistant Examiner* — Jose K Abraham
(74) *Attorney, Agent, or Firm* — The PL Law Group, PLLC

(57) ABSTRACT

An embedded inductance structure includes an insulating layer, an inductance located in the insulating layer, a multi-layer conducting circuit located in the insulating layer and on the upper surface and lower surface of the insulating layer, and a multi-layer conductive copper column layer located in the insulating layer. The inductance and the multi-layer conducting circuit are conductively connected via the multi-layer conductive copper column layer, and the inductance includes a magnet and an inductance coil in direct contact with the magnet, and the inductance coil is composed of a multi-layer conductive coil and a conductive copper column located between adjacent conductive coils. The multi-layer conductive coils are respectively in a ring shape with a notch and are disconnected at the notch, and the positions of the conductive copper columns located on the upper side and lower of each conductive coil are different in the longitudinal direction.

18 Claims, 7 Drawing Sheets

(51) Int. Cl.
*H01F 27/32* (2006.01)
*H01F 41/08* (2006.01)

(58) Field of Classification Search
CPC ........ H01F 41/046; H01F 27/28; H01F 27/24; H01F 27/306; H01F 41/04; H01F 41/041; H01F 27/2804; H01F 27/324; H01F 41/125; H01L 23/645
See application file for complete search history.

(56) References Cited

U.S. PATENT DOCUMENTS

| | | | | |
|---|---|---|---|---|
| 5,880,662 | A * | 3/1999 | Person | H01F 17/0013 336/200 |
| 2012/0119863 | A1* | 5/2012 | Wu | H01F 17/0013 29/832 |
| 2012/0212919 | A1* | 8/2012 | Mano | H05K 1/185 174/258 |
| 2013/0076456 | A1* | 3/2013 | Chang | H01F 17/0013 427/116 |
| 2013/0335186 | A1* | 12/2013 | Chang | H01F 5/003 336/200 |
| 2014/0125445 | A1* | 5/2014 | Sim | H01F 41/046 336/200 |
| 2015/0102890 | A1* | 4/2015 | Nakamura | H01F 27/2804 336/200 |
| 2015/0235765 | A1* | 8/2015 | Suzuki | H01F 41/046 216/17 |
| 2015/0340150 | A1* | 11/2015 | Nakamura | H01F 27/2804 336/200 |
| 2016/0196906 | A1* | 7/2016 | Kim | H01F 17/0013 29/606 |
| 2016/0276094 | A1* | 9/2016 | Lee | H01F 17/0013 |
| 2016/0343499 | A1* | 11/2016 | Nakamura | H01F 17/0013 |
| 2019/0043654 | A1* | 2/2019 | Chatani | H01F 27/245 |

* cited by examiner

EMBEDDED INDUCTANCE STRUCTURE AND MANUFACTURING METHOD THEREOF

CROSS REFERENCE TO RELATED APPLICATIONS AND CLAIM OF PRIORITY

The present application claims the benefit of Chinese Patent Application No. 202111530043.7 filed on Dec. 8, 2021 at the Chinese Intellectual Property Office, the disclosures of which are incorporated by reference herein in their entirety.

BACKGROUND

1. Technical Field

The present invention relates to electronic device packaging structures, and in particular to an embedded inductance structure and a manufacturing method thereof.

2. Background of the Invention

With the continuous development of electronic technology, the size of inductance devices in products is becoming smaller and more integrated such that the way of inductance embedding has been widely used. At the same time, the inductance capacitance requirement of the inductance is higher and higher.

The existing substrate embedded packaging scheme can realize the embedded packaging of a single inductance or a plurality of inductances. For example, the case that the substrate embedded packaging scheme disclosed in the Chinese patent CN113053849A embeds a single inductance or a plurality of inductances in a substrate at one time; the current inductance uses an embedded supporting frame inside which a conductive copper column is designed, a magnetic material is filled in the cavity of the supporting frame, and conducting circuits are used above and below to connect the conductive copper columns to form the inductance conductive coil.

In the existing embedded inductance scheme, the conductive coil is not in direct contact with the magnetic material, and the thickness of the insulating layer affects the inductance capacitance. The thicker the thickness is, the lower the inductance capacitance of the inductance is; a copper column is used to make a coil, adjacent coils are conducted through the copper column, the size of the copper column affects the coil spacing, dense coil windings cannot be realized, the number of coil turns in a fixed magnetic path length is small, and a high inductance value cannot be realized; there is a dielectric material between the coil and the magnetic material, and for the same conductive coil size, the magnet size cannot be maximized, affecting the inductance value.

SUMMARY

Embodiments of the present invention involve providing an embedded inductance structure and a manufacturing method thereof to solve the above technical problems. In the present invention, a line layer is used to make a coil, and a cavity body is formed by using a mechanical drilling method at the position of the coil such that the distance between the coil and the magnet can be reduced, and the magnet directly contacts with the coil, thereby effectively increasing the inductance capacitance of the inductance; the thin insulating layer can be laminated or silk-screened between the coil layers such that the thickness between the coil layers can be reduced, the number of coil turns can be increased, and the inductance capacitance of the inductance can be effectively improved; the coil of the inductance directly surrounds the surface of the magnet, and the size of the coil is fixed so as to maximize the magnet, which can effectively increase the inductance value of the inductance.

The first aspect of the present invention relates to a manufacturing method for an embedded inductance structure, including the steps of:

(a) preparing a temporary bearing plate;

(b) preparing a first conductive coil layer and a first conductive copper column layer on the first conductive coil layer on at least one side of the temporary bearing plate, wherein the first conductive coil layer includes a first conducting circuit and at least one first conductive coil, and the first conductive copper column layer is respectively in communication with the first conducting circuit and the first conductive coil;

(c) forming a first insulating layer on the first conductive coil layer and the first conductive copper column layer, and thinning the first insulating layer to expose an end portion of the first conductive copper column layer;

(d) repeating steps (b) and (c) to form an N-layer conductive coil layer, an N−1 layer conductive copper column layer, and an N-layer insulating layer, wherein N≥2;

(e) removing the temporary bearing plate;

(f) forming an inductance cavity body and an inductance coil exposed on an inner wall of the inductance cavity body in the N-layer conductive coil;

(g) filling a magnet in direct contact with the inductance coil in the inductance cavity body to form an inductance, and thinning the magnet such that the end portion of the magnet is flush with the inductance coil;

(h) respectively preparing an $N^{th}$ conductive copper column layer and an $(N+1)^{th}$ conductive copper column layer on an upper surface and lower surface of the N-layer insulating layer, wherein the $N^{th}$ conductive copper column layer is respectively in communication with the inductance coil and the $N^{th}$ conducting circuit, and the $(N+1)^{th}$ conductive copper column layer is respectively in communication with the inductance coil and the first conducting circuit;

(i) forming an $(N+1)^{th}$ insulating layer and an $(N+2)^{th}$ insulating layer on the $N^{th}$ conductive copper column layer and the $(N+1)^{th}$ conductive copper column layer respectively, and thinning the $(N+1)^{th}$ insulating layer and the $(N+2)^{th}$ insulating layer so as to expose end portions of the $N^{th}$ conductive copper column layer and the $(N+1)^{th}$ conductive copper column layer respectively;

and (j) fabricating an $(N+1)^{th}$ conducting circuit and an $(N+2)^{th}$ conducting circuit on the $(N+1)^{th}$ insulating layer and the $(N+2)^{th}$ insulating layer respectively, wherein the $(N+1)^{th}$ conducting circuit is conductively connected to the $N^{th}$ conducting circuit via the $N^{th}$ conductive copper column layer, and the $(N+2)^{th}$ conducting circuit is conductively connected to the first conducting circuit via the $(N+1)^{th}$ conductive copper column layer.

In some embodiments, after forming the inductance coil, the N-layer conductive coil each has a ring shape with a notch, and the N-layer conductive coil is disconnected at the notch.

In some embodiments, in step (c), the conductive copper columns on the upper side and lower side of each conductive coil have different positions in a longitudinal direction.

In some embodiments, the magnet includes an insulating magnet.

In some embodiments, the temporary bearing plate includes a metal plate or a glass substrate, a sacrificial copper foil, or a surface copper-clad plate to which a separating layer is applied.

In some embodiments, step (b) includes:

(b1) forming a first metal seed layer on at least one side of the temporary bearing plate;

(b2) applying a first photoresist layer on the first metal seed layer, and exposing and developing the first photoresist layer to form a first feature pattern;

(b3) plating copper in the first feature pattern to form a first conductive coil layer, wherein the first conductive coil layer includes a first conducting circuit and at least one first conductive coil;

(b4) removing the first photoresist layer, and etching the exposed first metal seed layer;

(b5) applying a second photoresist layer on the first conductive coil layer, and exposing and developing the second photoresist layer to form a second feature pattern;

(b6) plating copper in the second feature pattern to form a first conductive copper column layer, wherein the first conductive copper column layer is respectively in communication with the first conducting circuit and the first conductive coil;

and (b7) removing the second photoresist layer.

In some embodiments, the cross section of the N-layer conductive coil is a complete circle, ellipse, or polygon.

In some embodiments, the cross section of the N-layer conductive coil is circular, elliptical, or polygonal with a notch at an edge.

In some embodiments, the cross section of the N-layer conductive coil has a ring shape with a notch at an outer-side edge.

In some embodiments, the insulating layer includes polyimide, epoxy resin, bismaleimide/triazine resin, polyphenylene ether, polyacrylate, prepreg, film-like organic resin, or a combination thereof.

In some embodiments, step (c) includes forming a first insulating layer on the first conductive coil layer and the first conductive copper column layer by laminating, screen printing, or photosensitive means.

In some embodiments, step (c) includes thinning the first insulating layer by plate grinding or plasma etching to expose the end portion of the first conductive copper column layer.

In some embodiments, step (f) includes forming an inductance cavity body and an inductance coil exposed to an inner wall of the inductance cavity body in the N-layer conductive coil by means of gong machine gong groove or laser cutting.

In some embodiments, step (g) includes filling the inductance cavity body with a magnet in direct contact with the inductance coil by means of screen printing or dispensing.

In some embodiments, the following is also included:

(k) succeeding step (j), respectively forming a first solder mask and a second solder mask on the $(N+1)^{th}$ conducting circuit and the $(N+2)^{th}$ conducting circuit, and respectively forming a first surface treatment layer and a second surface treatment layer in the first solder mask and the second solder mask.

In some embodiments, step (k) includes forming the first solder mask and the second solder mask on the $(N+1)^{th}$ conducting circuit and the $(N+2)^{th}$ conducting circuit, respectively, by means of screen printing, printing, or photosensitive means.

In some embodiments, step (k) includes forming a first surface treatment layer and a second surface treatment layer in the first solder mask and the second solder mask, respectively, by oxidation resistance, ENEPIG, tin plating, or silver plating.

According to the second aspect of the present invention, there is provided an embedded inductance structure manufactured by using the manufacturing method for an embedded inductance structure according to the first aspect of the present invention.

In some embodiments, the present invention includes an insulating layer, an inductance located in the insulating layer, and a multi-layer conducting circuit located in the insulating layer and on the upper surface and lower surface of the insulating layer, and further includes a multi-layer conductive copper column layer located in the insulating layer, wherein the inductance and the multi-layer conducting circuit are conductively connected via the multi-layer conductive copper column layer, and the inductance includes a magnet and an inductance coil in direct contact with the magnet, and the inductance coil is composed of a multi-layer conductive coil and a conductive copper column located between adjacent conductive coils, and the multi-layer conductive coil each has a ring shape with a notch and is disconnected at the notch, and the positions of the conductive copper columns located on the upper side and lower side of each conductive coil are different in the longitudinal direction.

In some possible embodiments, the invention further includes a first solder mask and a second solder mask respectively located on the upper surface and lower surface of the insulating layer, and a first surface treatment layer and a second surface treatment layer respectively located in the first solder mask and the second solder mask.

BRIEF DESCRIPTION OF THE DRAWINGS

For a better understanding of the present invention and to show embodiments thereof, reference will now be made below, purely by way of example, to the accompanying drawings.

With specific reference to the accompanying drawings, it is stressed that the particular illustrations are by way of examples and for purposes of illustrative discussion of the preferred embodiments of the present invention only, and are presented in the cause of providing what is believed to be the most useful and readily understood illustration of the description of the principles and conceptual aspects of the present invention. In this regard, no attempt is made to show structural details of the invention in more detail than is necessary for a fundamental understanding of the invention; the description taken with the drawings makes it apparent to those skilled in the art how the several forms of the present invention may be embodied in practice. In the drawings.

DETAILED DESCRIPTION OF THE INVENTION

Figure 1:
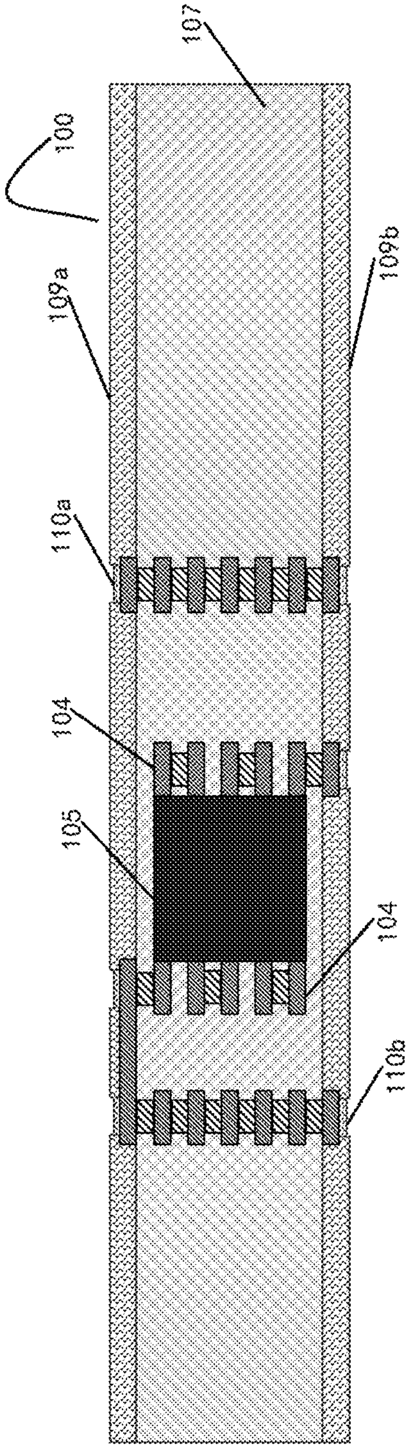
FIG. 1 is a schematic longitudinal cross sectional view of an embedded inductance structure according to one embodiment of the present invention.
Figure 2:
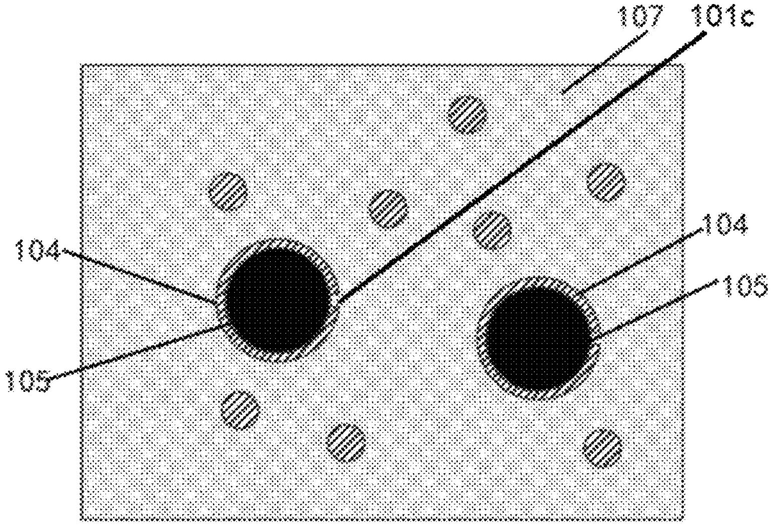
FIG. 2 is a schematic transverse cross sectional view of an embedded inductance structure according to one embodiment of the present invention.

Referring to FIGS. 1 and 2, FIG. 1 shows a schematic longitudinal cross sectional view of an embedded inductance structure 100 and FIG. 2 shows a schematic transverse cross sectional view of the embedded inductance structure 100. The embedded inductance structure 100 includes an insulating layer 107, an inductance located in the insulating layer 107, a multi-layer conducting circuit located in the insulating layer 107 and on the upper surface and lower surface of the insulating layer 107, and a multi-layer conductive copper column layer located in the insulating layer 107, the inductance and the multiple layers of conducting circuits being conductively connected via the multi-layer conductive copper column layer. The insulating layer 107 may include polyimide, epoxy resin, bismaleimide/triazine resin, polyphenylene ether, polyacrylate, prepreg, film-like organic resin, or a combination thereof. In general, the conductive copper column layer may be provided with a plurality of copper columns having the same or different cross sectional sizes.

Figure 3:
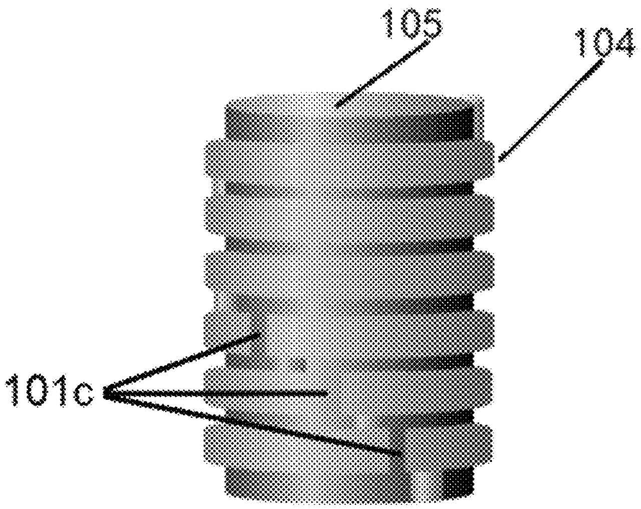
FIG. 3 is a schematic view of an inductance structure according to one embodiment of the present invention.

Referring to FIG. 3, a schematic view of an inductance structure is shown. The inductance includes a magnet 105 and an inductance coil 104 in direct contact with the magnet. The inductance coil 104 directly surrounds the surface of the magnet 105, and the fixed coil size can achieve the maximum magnet and effectively increase the inductance value of the inductance. The inductance coil 104 is composed of a multi-layer conductive coil and a conductive copper column located between adjacent conductive coils. Each of the multi-layer conductive coils has a ring shape with a notch and is disconnected at the notch, and the conductive copper columns located at the upper side and lower side of each conductive coil have different positions in the longitudinal direction, which can not only ensure the conduction between the multi-layer conductive coils, but also can avoid the occurrence of a short circuit between the multi-layer conductive coils.

The embedded inductance structure 100 further includes a first solder mask 109*a* and a second solder mask 109*b* respectively located on the upper surface and lower surface of the insulating layer 107, and a first surface treatment layer 110*a* and a second surface treatment layer 110*b* respectively located in the first solder mask 109*a* and the second solder mask 109*b*.

Referring to FIGS. 4A to 4I, schematic cross sectional views of an intermediate structure at various steps of a manufacturing method for an embedded inductance structure according to one embodiment of the present invention are shown.

Figure 4A:
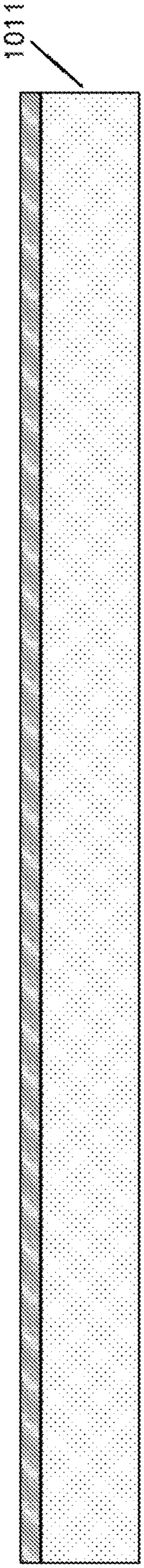
FIGS. 4A-4I show schematic cross sectional views of an intermediate structure at various steps of a manufacturing method for an embedded inductance structure according to one embodiment of the present invention.

The manufacturing method includes the steps of preparing a temporary bearing plate 1011, as shown in FIG. 4A. The temporary bearing plate 1011 can be any metal plate or glass substrate with a separating layer applied on the surface, such as a copper plate, an aluminum plate, a stainless steel plate, or an aluminum alloy plate, and can also be a sacrificial copper foil or a surface copper-clad plate; preferably, the temporary bearing plate 1011 in this embodiment is a metal plate to which a separating layer is applied on its surface. In general, the temporary bearing plate 1011 may be a metal plate to which a separating layer is applied only on a single side surface thereof, or a metal plate to which a separating layer is applied on both side surfaces thereof. The subsequent process of this embodiment only demonstrates the metal plate to which a separating layer is applied on a single side surface, but does not represent that the subsequent operation can be performed only on a single side of the metal plate.

Figure 4B:
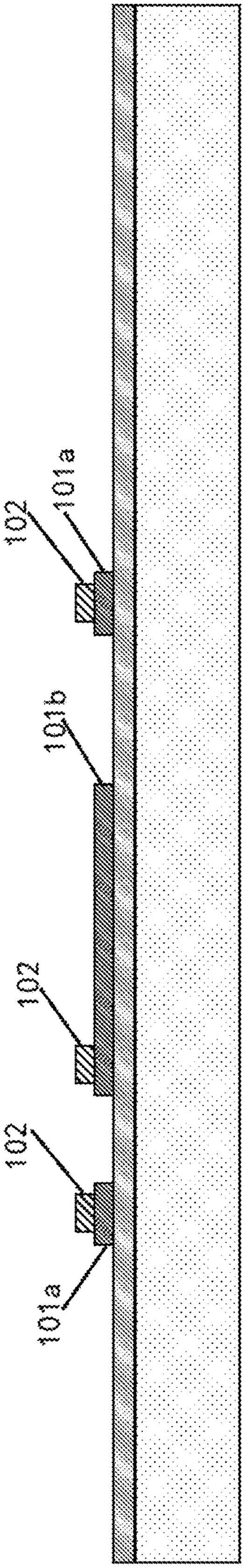

Next, a first conductive coil layer and a first conductive copper column layer 102 on the first conductive coil layer are prepared on the temporary bearing plate 1011. The first conductive coil layer includes a first conducting circuit 101*a* and at least one first conductive coil 101*b*, and the first conductive copper column layer 102 is in communication with the first conducting circuit 101*a* and the first conductive coil 101*b*, respectively, as shown in FIG. 4B. Generally, the following steps are included:

(b1) forming a first metal seed layer on the temporary bearing plate 1011;

(b2) applying a first photoresist layer on the first metal seed layer, exposing and developing the first photoresist layer to form a first feature pattern;

(b3) plating copper in the first feature pattern to form a first conductive coil layer, wherein the first conductive coil layer includes a first conducting circuit 101*a* and at least one first conductive coil 101*b;*

(b4) removing the first photoresist layer and etching the exposed first metal seed layer;

(b5) applying a second photoresist layer on the first conductive coil layer, and exposing and developing the second photoresist layer to form a second feature pattern;

(b6) plating copper in the second feature pattern to form a first conductive copper column layer 102, wherein the first conductive copper column layer 102 is respectively in communication with the first conducting circuit 101*a* and the first conductive coil 101*b;* and (b7) removing the second photoresist layer.

In general, the number of conductive coils in each conductive coil layer can be determined according to actual needs, and the shape of the cross section of the conductive coil can also be determined according to actual needs, for example, the case that it can be a complete circle, an ellipse, or a polygon, such as a triangle, a rectangle, a regular pentagon, or a regular hexagon, which is not particularly limited; the shape of the cross section of the conductive coil may also be a circle, an ellipse, or a polygon with a notch at the edge; the cross section of the conductive coil may also be shaped as a ring with a notch at the outer-side edge.

A plurality of copper via columns may be provided in the conductive copper column layer as a switching IO channel so as to realize the conduction between the conductive coil layers, and the sizes and/or shapes of the plurality of copper via columns may be the same or may be different; the copper via column may be a solid copper column or a hollow copper column plated with copper at the edge. Preferably, the copper via column is a solid copper column.

Generally, the metal seed layer can be formed by electroless plating or sputtering, and the metal seed layer can include titanium, copper, a titanium tungsten alloy, or a combination thereof; preferably, the metal seed layer is made by sputtering titanium and copper.

Figure 4C:
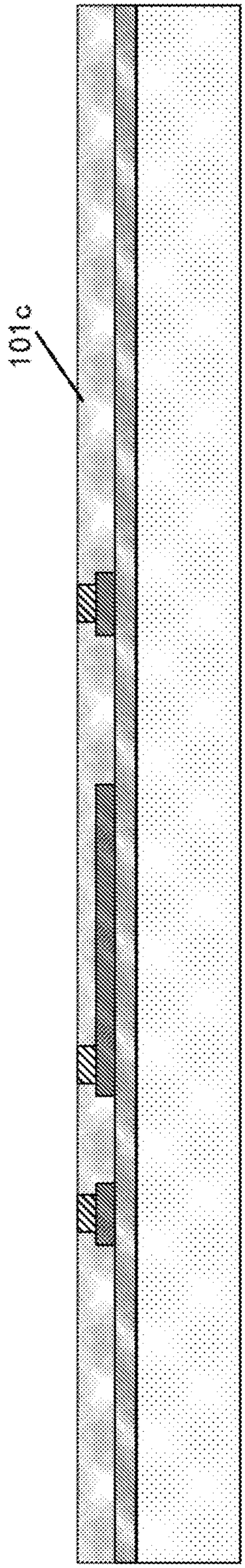

Then, a first insulating layer 101*c* is formed on the first conductive coil layer and the first conductive copper column layer 102, and the first insulating layer 101*c* is thinned to expose an end portion of the first conductive copper column layer 102, as shown in FIG. 4C. In general, the insulating layer may include polyimide, epoxy resin, bismaleimide/triazine resin, polyphenylene ether, polyacrylate, prepreg, film-like organic resin, or a combination thereof. An insulating layer can be formed on the conductive coil layer and the conductive copper column layer by means of laminating, screen printing, or photoreceptive; the insulating layer is preferably made by means of laminating or screen printing.

Generally, the insulating layer can be integrally thinned, for example, the case that the insulating layer can be integrally thinned by means of plate grinding or plasma etching; it is also possible to locally thin the insulating layer, for example by means of laser or mechanical drilling; alternatively, when the insulating layer is a photosensitive dielectric material, the insulating layer can be locally thinned by means of exposure and development. Preferably, the insulating layer is integrally thinned by plate grinding or plasma etching to expose the end portion of the conductive copper column layer.

Figure 4D:
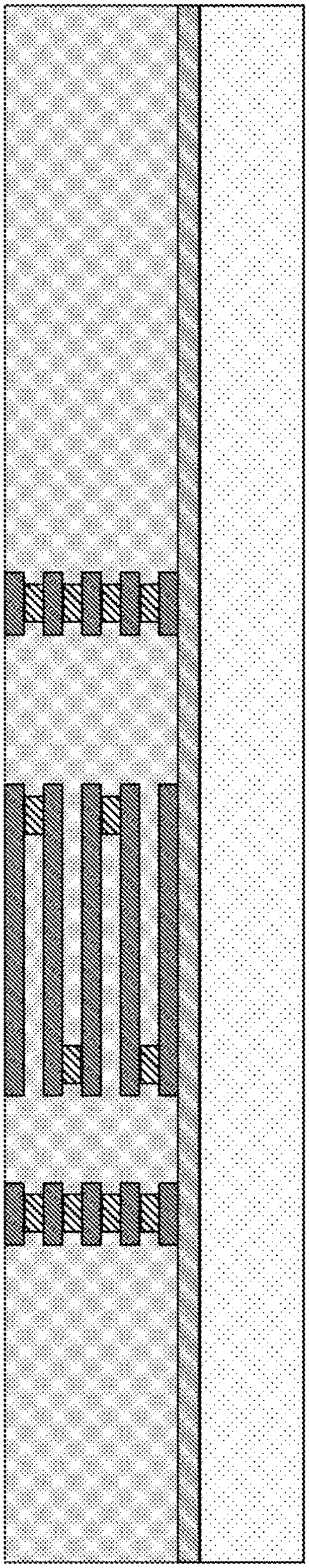

Then, step (b) and step (c) are repeated to form a five-layer conductive coil layer, a four-layer conductive copper column layer, and a five-layer insulating layer, as shown in FIG. 4D. It could be understood that the number and size of the conductive coil layer can be made as desired and that the size of the conductive coil in the conductive coil layer can be adjusted as desired or spatially.

Figure 4E:
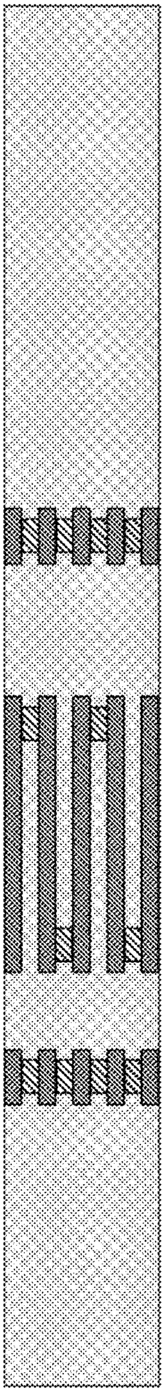
Figure 4F:
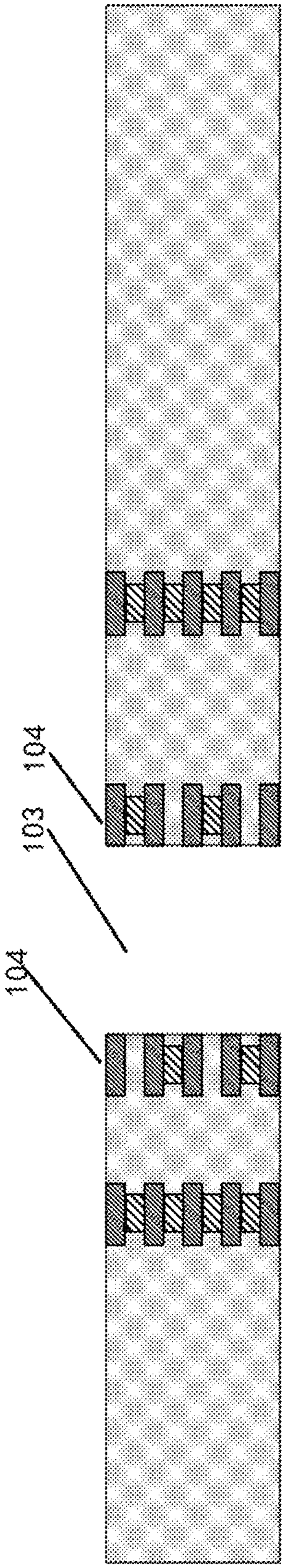

Next, the temporary bearing plate 1011 is removed, as shown in FIG. 4E. It needs to be noted that the conducting circuit of the conductive coil layer may start at any layer according to practical requirements; after the plates are divided, a conducting circuit can continue to be made, and the number of turns is not limited; a single-layer conducting circuit can be made or a multi-layer conducting circuit can be made;

- then, an inductance cavity body 103 and an inductance coil 104 exposed to the inner wall of the inductance cavity body are formed in the five-layer conductive coil, as shown in FIG. 4F. It needs to be noted that after forming the inductance coil 104, each conductive coil has a ring shape with a notch, each conductive coil is disconnected at the notch, and the positions of the conductive copper columns on the upper side and lower side of each conductive coil in the longitudinal direction are different, which can not only ensure the conduction between multi-layer conductive coils, but also can avoid the occurrence of a short circuit between multi-layer conductive coils.

Generally, the inductance cavity body 103 and the inductance coil 104 are formed by means of mechanical drilling so as to avoid damages to the rest of the conductive coil and the conductive copper column; for example, the case that the inductance cavity 103 and the inductance winding 104 exposed to the inner wall of the inductance cavity may be formed by means of choosing gong machine gong groove or laser cutting method according to the required size of the inductance cavity body 103.

When the cross section of the conductive coil is a complete circle, ellipse, or polygon, the inductance cavity body and the inductance coil may be formed by two mechanical drillings. When the cross section of the conductive coil is a circle, an ellipse, or a polygon with a notch at the edge, the inductance cavity body and the inductance coil can be formed by one-time mechanical drilling, i.e., adding a notch can reduce one-time drilling process and improve the efficiency. When the cross section of the conductive coil has a ring shape with a notch at the outer-side edge, the inductance cavity body and the inductance coil can be formed by one-time mechanical drilling, and the wear of the conductive coil on the drill bit during the drilling can be reduced, so as to achieve the effect of increasing the number of holes used by the drill bit and improving the drilling quality.

Figure 4G:
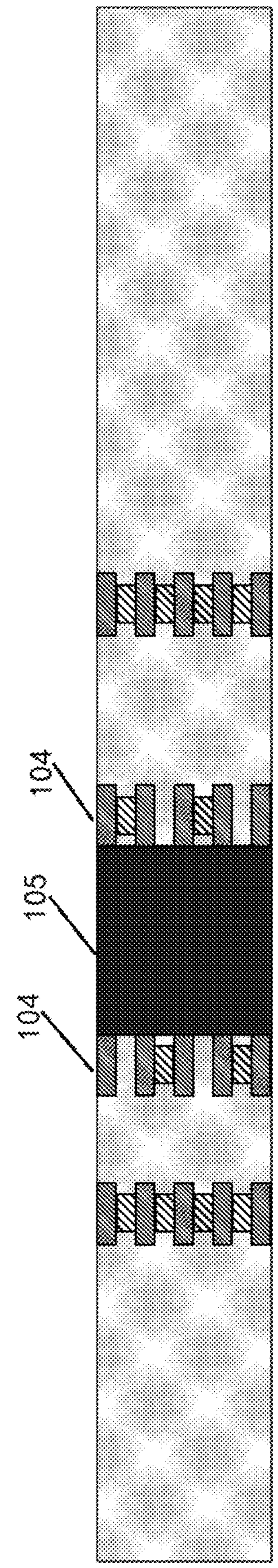

Next, a magnet 105 in direct contact with the inductance coil 104 is filled in the inductance cavity body 103 to form an inductance, and the magnet 105 is thinned such that the end portion of the magnet 105 is flush with the inductance coil 104, as shown in FIG. 4G.

In general, the following sub-steps may be included:

(g1) magnetic material treatment;

(g2) filling magnetic material;

and (g3) curing the magnetic material.

It needs to be noted that the magnetic material may be treated and cured by any method known in the art for treating and curing magnetic materials. The magnet 105 in direct contact with the inductance coil 104 can be filled in the inductance cavity body 103 by means of screen printing or dispensing; the inductance coil 104 directly surrounds the surface of the magnet 105, and a fixed coil size can maximize the magnet and effectively increase the inductance value of the inductance. The magnet 105 includes an insulating magnet to avoid a short circuit by the communication between the magnet and the inductance coil 104.

In order to thin the magnet 105 such that the end portion of the magnet 105 is flush with the inductance coil 104, the magnet 105 may be thinned in a manner of mechanical rough grinding-mechanical fine grinding-magnetic material curing-magnet surface polishing.

Then, a fifth conductive copper column layer 106*a* and a sixth conductive copper column layer 106*b* are respectively prepared on the upper surface and lower surface of the five-layer insulating layers. The fifth conductive copper column layer 106*a* is respectively in communication with the inductance coil 104 and the fifth conducting circuit. The sixth conductive copper column layer 106*b* is respectively in communication with the inductance coil 104 and the first conducting circuit 101*a*. In general, the following sub-steps may be included:

- respectively forming a second metal seed layer and a third metal seed layer on the upper surface and lower surface of the five-layer insulating layer;
- respectively applying a second photoresist layer and a third photoresist layer on the second metal seed layer and the third metal seed layer, and exposing and developing the second photoresist layer and the third photoresist layer to respectively form a second feature pattern and a third feature pattern;
- plating copper in the second feature pattern to form a fifth conductive copper column layer 106*a*, and plating copper in the third feature pattern to form a sixth conductive copper column layer 106*b;*
- respectively etching the exposed second metal seed layer and third metal seed layer;
- and respectively removing the second photoresist layer and the third photoresist layer.

Next, a sixth insulating layer and a seventh insulating layer are respectively formed on the fifth conductive copper column layer 106*a* and the sixth conductive copper column layer 106*b*, respectively, and the sixth insulating layer and the seventh insulating layer are thinned to expose the end portions of the fifth conductive copper column layer 106*a* and the sixth conductive copper column layer 106*b*, respectively. The first insulating layer to the seventh insulating layer collectively form the insulating layer 107.

Figure 4H:
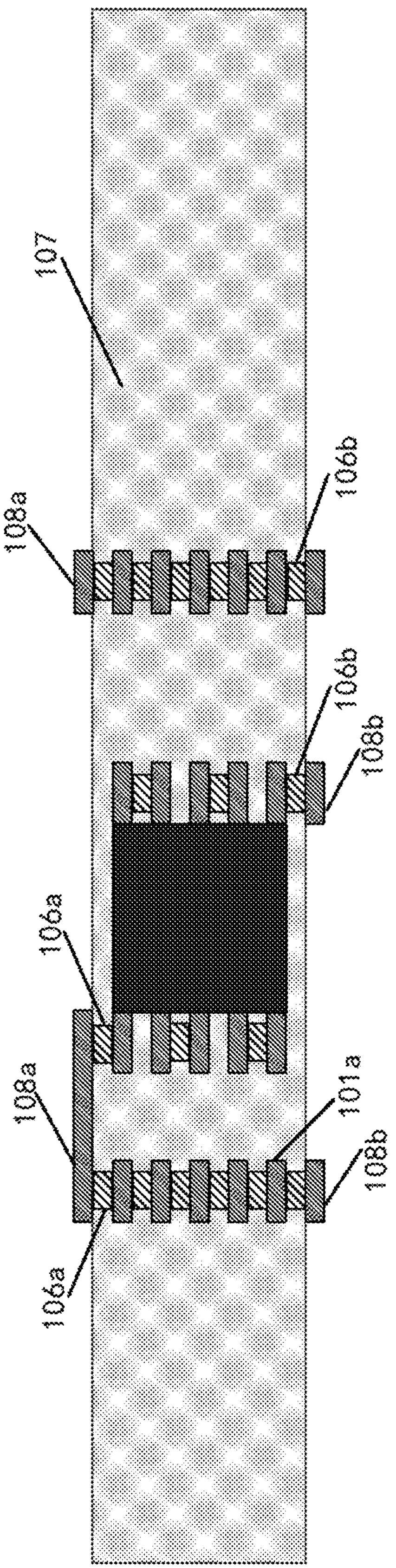

Then, a sixth conducting circuit 108*a* and a seventh conducting circuit 108*b* are respectively made on the upper surface and lower surface of the insulating layer 107. The sixth conducting circuit 108*a* is conductively connected to the fifth conducting circuit through the fifth conductive copper column layer 106*a*, and the seventh conducting circuit 108*b* is conductively connected to the first conducting circuit 101*a* through the sixth conductive copper column layer 106*b*, as shown in FIG. 4H. In general, the following sub-steps may be included:

forming a fourth metal seed layer and a fifth metal seed layer on the upper surface and lower surface of the insulating layer 107 respectively;

respectively applying a fourth photoresist layer and a fifth photoresist layer on the fourth metal seed layer and the fifth metal seed layer, and exposing and developing the fourth photoresist layer and the fifth photoresist layer to respectively form a fourth feature pattern and a fifth feature pattern;

plating copper in the fourth feature pattern to form a sixth conducting circuit 108*a*, and plating copper in the fifth feature pattern to form a seventh conducting circuit 108*b;* respectively removing the second photoresist layer and the third photoresist layer;

and respectively etching the exposed third metal seed layer and fourth metal seed layer.

Figure 4I:
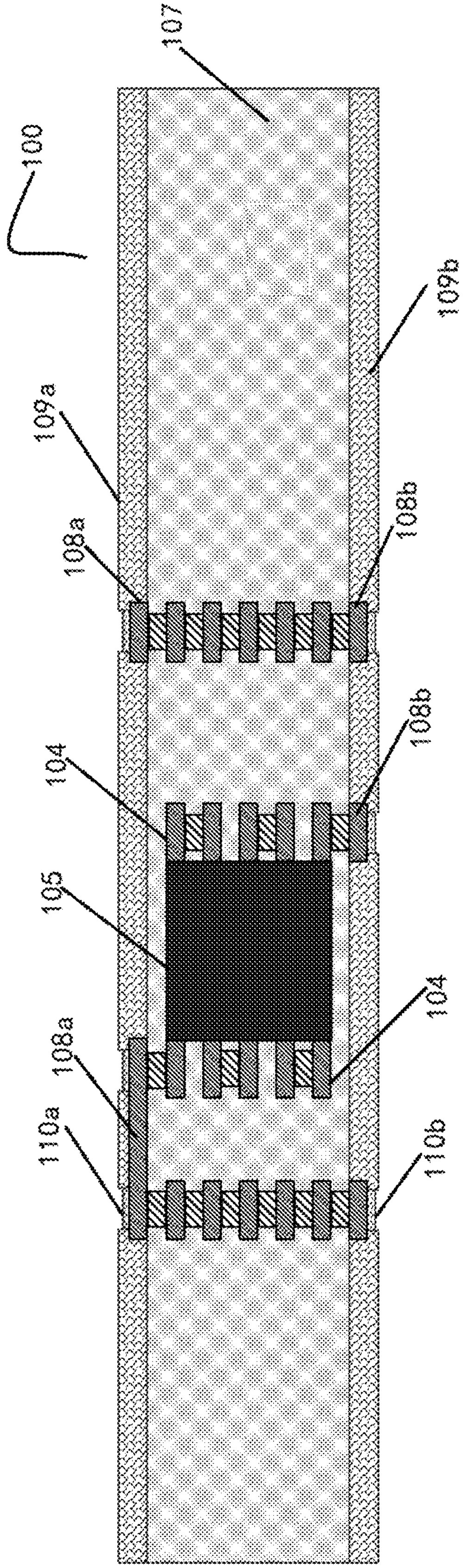

Finally, a first solder mask 109*a* and a second solder mask 109*b* are respectively formed on the sixth conducting circuit 108*a* and the seventh conducting circuit 108*b*, and a first surface treatment layer 110*a* and a second surface treatment layer 110*b* are respectively formed in the first solder mask 109*a* and the second solder mask 109*b*, resulting in the embedded inductance structure 100, as shown in FIG. 4I. Generally, the first solder mask 109*a* and the second solder mask 109*b* can be respectively formed on the sixth conducting circuit 108*a* and the seventh conducting circuit 108*b* by means of screen printing, printing, or photosensitive means; for example, the case that the solder mask may be formed through a process of solder resist pre-treatment→screen printing solder mask→solder mask exposure→solder mask development.

It needs to be noted that the exposed metal may be surface treated to form a first surface treatment layer 110*a* and a second surface treatment layer 110*b* in the first solder mask 109*a* and the second solder mask 109*b*, respectively; the exposed metal may be surface treated by oxidation resistance, ENEPIG, tin plating, or silver plating.

It will be appreciated by persons skilled in the art that the present invention is not limited by what has been particularly shown and described herein. Rather, the scope of the present invention is defined by the appended claims, including both combinations and sub-combinations of the various technical features described hereinabove, as well as variations and modifications thereof, which would occur to persons skilled in the art upon reading the foregoing description.

In the claims, the term "comprises" and variations thereof such as "includes", "comprising" and the like mean that the recited assembly is included, but not generally excluding other assemblies.

What is claimed is:

1. A method for manufacturing an embedded inductance structure, the method comprising:

(a) preparing a temporary bearing plate;

(b) preparing a first conductive coil layer and a first conductive copper column layer on the first conductive coil layer on at least one side of the temporary bearing plate, wherein the first conductive coil layer comprises a first conducting circuit and at least one first conductive coil, and the first conductive copper column layer comprises at least two first conductive copper columns respectively in contact with the first conducting circuit and the first conductive coil;

(c) forming a first insulating layer on the first conductive coil layer and the first conductive copper column layer, and thinning the first insulating layer to expose an end portion of the first conductive copper column layer;

(d) forming an inductance coil by repeating steps (b) and (c) to form an N-layer conductive coil layer, an N−1 layer conductive copper column layer, and an N-layer insulating layer, wherein N≥3;

(e) removing the temporary bearing plate;

(f) forming an inductance cavity body in the N-layer conductive coil layer, wherein the inductance coil exposed on an inner wall of the inductance cavity body;

(g) filling a magnet in direct contact with the inductance coil in the inductance cavity body to form an inductance, and thinning the magnet such that an end portion of the magnet is flush with the inductance coil;

(h) respectively preparing an $N^{th}$ conductive copper column layer and an $(N+1)^{th}$ conductive copper column layer on an upper surface and lower surface of the N-layer insulating layer, wherein the $N^{th}$ conductive copper column layer is respectively in contact with the inductance coil and the $N^{th}$ conducting circuit, and the $(N+1)^{th}$ conductive copper column layer is respectively in contact with the inductance coil and the first conducting circuit;

(i) forming an $(N+1)^{th}$ insulating layer and an $(N+2)^{th}$ insulating layer on the $N^{th}$ conductive copper column layer and the $(N+1)^{th}$ conductive copper column layer respectively, and thinning the $(N+1)^{th}$ insulating layer and the $(N+2)^{th}$ insulating layer so as to expose end portions of the $N^{th}$ conductive copper column layer and the $(N+1)^{th}$ conductive copper column layer respectively;

(j) fabricating an $(N+1)^{th}$ conducting circuit and an $(N+2)^{th}$ conducting circuit on the $(N+1)^{th}$ insulating layer and the $(N+2)^{th}$ insulating layer respectively, wherein the $(N+1)^{th}$ conducting circuit is conductively connected to the $N^{th}$ conducting circuit via the $N^{th}$ conductive copper column layer, and the $(N+2)^{th}$ conducting circuit is conductively connected to the first conducting circuit via the $(N+1)^{th}$;

conductive copper column layer; and (k) respectively forming a first solder mask and a second solder mask on the $(N+1)^{th}$ conducting circuit and the $(N+2)^{th}$ conducting circuit, and respectively forming a first surface treatment layer and a second surface treatment layer in the first solder mask and the second solder mask.

2. The method of claim 1, wherein each conductive coil of the N-layer conductive coil is formed as a ring shape with a notch, wherein each conductive coil of the N-layer conductive coil is discontinuous at the notch.

3. The method of claim 1, wherein in step (c), the conductive copper columns on upper side and lower side of each conductive coil have different positions in a longitudinal direction.

4. The method of claim 1, wherein the magnet comprises an insulating magnet.

5. The method of claim 1, wherein the temporary bearing plate comprises a metal plate or a glass substrate, a sacrificial copper foil, or a surface copper-clad plate to which a separating layer is applied.

6. The method of claim 1, wherein step (b) comprises:

(b1) forming a first metal seed layer on at least one side of the temporary bearing plate;

(b2) applying a first photoresist layer on the first metal seed layer, and exposing and developing the first photoresist layer to form a first feature pattern;

(b3) plating copper in the first feature pattern to form a first conductive coil layer, wherein the first conductive coil layer comprises a first conducting circuit and at least one first conductive coil;

(b4) removing the first photoresist layer, and etching exposed first metal seed layer;

(b5) applying a second photoresist layer on the first conductive coil layer, and exposing and developing the second photoresist layer to form a second feature pattern;

(b6) plating copper in the second feature pattern to form a first conductive copper column layer, wherein the first conductive copper column layer is respectively in contact with the first conducting circuit and the first conductive coil; and (b7) removing the second photoresist layer.

7. The method of claim 1, wherein a cross section of each conductive coil of the N-layer conductive coil is a complete circle, ellipse, or polygon.

8. The method of claim 2, wherein the cross section of each conductive coil of the N-layer conductive coil is a circle, an ellipse, or a polygon with a notch to cause it discontinuous at the notch.

9. The method of claim 1, wherein the insulating layer comprises polyimide, epoxy resin, bismaleimide/triazine resin, polyphenylene ether, polyacrylate, prepreg, film-like organic resin, or a combination thereof.

10. The method of claim 1, wherein step (c) comprises forming a first insulating layer on the first conductive coil layer and the first conductive copper column layer by laminating, screen printing, or photosensitive means.

11. The method of claim 1, wherein step (c) comprises thinning the first insulating layer by plate grinding or plasma etching to expose the end portion of the first conductive copper column layer.

12. The method of claim 1, wherein step (f) comprises forming an inductance cavity body and an inductance coil exposed to an inner wall of the inductance cavity body in the N-layer conductive coil by means of gong machine gong groove or laser cutting.

13. The method of claim 1, wherein step (g) comprises filling the inductance cavity body with a magnet in direct contact with the inductance coil by means of screen printing or dispensing.

14. The method of claim 1, wherein step (k) comprises forming the first solder mask and the second solder mask on the $(N+1)^{th}$ conducting circuit and the $(N+2)^{th}$ conducting circuit, respectively, by means of screen printing, printing, or photosensitive means.

15. The method of claim 1, wherein step (k) comprises forming a first surface treatment layer and a second surface treatment layer in the first solder mask and the second solder mask, respectively, by oxidation resistance, ENEPIG, tin plating, or silver plating.

16. An embedded inductance structure manufactured by the method of claim 1.

17. The embedded inductance structure according to claim 16, comprising an insulating layer, an inductance located in the insulating layer, and a multi-layer conducting circuit located in the insulating layer and on the upper surface and lower surface of the insulating layer, and further comprising a multi-layer conductive copper column layer located in the insulating layer, wherein the inductance and the multi-layer conducting circuit are conductively connected via the multi-layer conductive copper column layer, and the inductance comprises a magnet and an inductance coil in direct contact with the magnet, and the inductance coil is composed of a multi-layer conductive coil and a conductive copper column located between adjacent conductive coils, and the multi-layer conductive coil each has a ring shape with a notch to cause it discontinuous at the notch, and the positions of the conductive copper columns located on the upper side and lower side of each conductive coil are different in the longitudinal direction.

18. The embedded inductance structure according to claim 17, further comprising a first solder mask and a second solder mask respectively located on upper surface and lower surface of the insulating layer, and a first surface treatment layer and a second surface treatment layer respectively located in the first solder mask and the second solder mask.

* * * * *